US011912061B2

(12) United States Patent
Dragich

(10) Patent No.: US 11,912,061 B2
(45) Date of Patent: Feb. 27, 2024

(54) WAVY CANVAS FRAME

(71) Applicant: Predrag Dragich, Baltimore, OH (US)

(72) Inventor: Predrag Dragich, Baltimore, OH (US)

(*) Notice: Subject to any disclaimer, the term of this patent is extended or adjusted under 35 U.S.C. 154(b) by 1158 days.

(21) Appl. No.: 16/119,279

(22) Filed: Aug. 31, 2018

(65) Prior Publication Data

US 2019/0291503 A1 Sep. 26, 2019

Related U.S. Application Data

(60) Provisional application No. 62/645,566, filed on Mar. 20, 2018.

(51) Int. Cl.
*B44D 3/18* (2006.01)

(52) U.S. Cl.
CPC .................................... *B44D 3/185* (2013.01)

(58) Field of Classification Search
CPC ........ G09F 1/06; G09F 15/00; G09F 15/0037; G09F 15/0068; A47G 5/00; E04B 2/74; E04B 2002/7461; E04B 2002/7472; E04B 2002/7479; E04B 2/72; E04B 2/7401; E04B 2/7403; E04B 2/7407; E04B 2/7409; E04B 2/7412; E04B 2/7457; E04B 2/7461; E04B 2/7481; E06B 1/006; E06B 1/04; E06B 1/32
USPC ..... 40/606.12, 738, 603, 604, 768; 160/351, 160/353, 371, 378
See application file for complete search history.

(56) References Cited

U.S. PATENT DOCUMENTS

| | | | | | |
|---|---|---|---|---|---|
| 3,147,336 | A * | 9/1964 | Mathews | H05K 9/0001 | 52/794.1 |
| 3,713,474 | A * | 1/1973 | Orlando | E04B 2/7409 | 52/239 |
| 4,065,596 | A | 12/1977 | Groody | | |
| 4,549,596 | A | 10/1985 | Staro | | |
| 4,635,418 | A * | 1/1987 | Hobgood | A47B 47/042 | 312/265.5 |
| 5,218,807 | A * | 6/1993 | Fulford | E06B 3/822 | 49/501 |
| 5,903,992 | A * | 5/1999 | Eisenberg | G09F 1/12 | 40/605 |
| 5,966,894 | A * | 10/1999 | Crump, Jr. | E04C 3/14 | 52/404.3 |

(Continued)

FOREIGN PATENT DOCUMENTS

| | | |
|---|---|---|
| DE | 202005017365 U1 | 5/2006 |
| DE | 102006033193 A1 | 1/2008 |
| DE | 202008000602 U1 | 5/2009 |

OTHER PUBLICATIONS

Peters, Rudi. NPL of Translated Foreign Patent Description of DE202008000602U1, May 28, 2009 (Year: 2009).*

(Continued)

*Primary Examiner* — Cassandra Davis
(74) *Attorney, Agent, or Firm* — Standley Law Group LLP; F. Michael Speed; Kenny W. Pung

(57) ABSTRACT

Exemplary embodiments of the present invention are directed to curvilinear frame that may have canvas applied to the outside to create a 360-degree painting surface. The inventive frame gives a wavy or flowing look and may be painted on all exterior surfaces. The inventive frame utilizes new and improved strength-bearing studs made of a light-weight, sturdy foam being surrounded by a rigid member, typically wood.

10 Claims, 7 Drawing Sheets

(56) References Cited

U.S. PATENT DOCUMENTS

| | | | | |
|---|---|---|---|---|
| 6,094,877 | A * | 8/2000 | White | E04H 4/0043 52/631 |
| 6,519,881 | B1 | 2/2003 | Chase | |
| 6,729,060 | B1 * | 5/2004 | Rietkerk | A47G 1/1653 40/738 |
| 7,698,840 | B2 | 4/2010 | Rutkowski | |
| 8,276,335 | B2 * | 10/2012 | Waibel | E04B 2/82 52/846 |
| 8,707,629 | B2 * | 4/2014 | Cuffe | E04B 2/7425 52/79.5 |
| 9,096,094 | B2 | 8/2015 | Kaishian et al. | |
| 9,783,985 | B2 * | 10/2017 | Iverson | E04B 2/70 |
| 9,890,532 | B2 * | 2/2018 | Thompson | E04C 3/127 |
| 2003/0126777 | A1 * | 7/2003 | Doone | G09F 15/0025 40/603 |
| 2004/0049997 | A1 * | 3/2004 | Wheeler | E04C 3/02 52/204.2 |
| 2007/0130866 | A1 * | 6/2007 | Lott | E04C 2/246 52/481.1 |
| 2011/0146126 | A1 * | 6/2011 | Phillips | A47G 1/14 156/212 |

OTHER PUBLICATIONS

Screen captures from YouTube video clip entitled “Steve Barton—Where it began,” 2 pages, uploaded on Jul. 31, 2015 by user “Steve Barton”. Retrieved from Internet: < https://www.youtube.com/watch?v=s-v-DU8k8GE>. (Year: 2015).*

Instagram post entitled “When you have multiple ideas at once, you make it work.” 1 page, posted Oct. 9, 2016 by user “stevebartonofficial”. Retrieved from Internet: < https://www.instagram.com/p/BLXGi9tD2Yz/?igshid=YmMyMTA2M2Y=>. (Year: 2016).*

* cited by examiner

WAVY CANVAS FRAME

CROSS-REFERENCE TO RELATED APPLICATIONS

This application is a non-provisional application and claims priority to U.S. application 62/645,566 filed on Mar. 20, 2018, the contents of which are incorporated by reference as if fully recited herein.

TECHNICAL FIELD

Exemplary embodiments of the present invention relate to a curvilinear frame capable of securing a material for painting or other artistic expression and having lightweight, improved strength-bearing studs.

BACKGROUND AND BRIEF SUMMARY OF THE INVENTION

Canvas has historically been one of the most popular painting mediums. Canvas painting's first known use traces back to the 14th century but wouldn't gain popularity for another couple hundred years. Advancements in the field have come a long way since then. New materials, new processes of making, new stretchers, and new coatings are just a few of the innovations that are ever-changing. Frames for canvas have advanced too, but innovations are few and far between. A canvas frame needs to be sturdy enough to support mounting and not bend under the pressure of the stretched canvas while remaining lightweight for easy transportation. Furthermore, the typical flat rectangular frame adds little variety to our progressive society.

The present invention is directed to a wavy or curvilinear frame that includes at least one concave or convex curve. The present inventive frame will change not only the viewing experience for the observer but also the painting experience for the artist. The wavy or curved frame may be used as a single piece of artwork. The wavy or curved frame may also be used in a collection of works either from the same artist or as a collaboration between artists wherein multiple curved frames are mounted in succession creating a single flowing artwork. In such an embodiment, each separate painting may occupy a variety of curved frames. The inventive frame will allow for 360 degrees of painting. Each surface may be covered in canvas and the artist may further explore painting on the sides of the frame. Additionally, a curved frame may be painted on the back of the frame such that the back-painting may be viewed as a wave extends away from the wall. Or, a curved frame may be suspended from the ceiling and allowed to rotate offering much more surface area of the frame to be painted and viewed than previously known in the art.

Such a frame will allow for elaborate use of shadows in combination with the paint to allow a different observer experience. A canvas on such a frame may lead to an artist intentionally painting different portions of the canvas for different light combinations. For example, if such a painting was on display, light could be directed from both left and right angles to display a different painting. Such an exhibit may alter the light periodically to give the observer a never before seen experience wherein the painting looks substantially different when viewed in solely light from the left, solely light from the right, or light from all angles. Such an unexplored and innovative canvas frame with a new lighting scheme is something much needed in the art and something that the present invention solves. Furthermore, the canvas may allow for attachment of an LED or other similar backlight to the reverse side of the frame. These backlights and associated batteries may be mounted onto a solid wood stud and fully hidden behind the frame.

Because a curved frame will naturally have more material than a flat frame of the same length, it is important to keep the weight of all materials to a minimum. However, the frame still needs to be sturdy enough to withstand the forces of a stretched canvas or any mounting apparatus. To meet this end, the frame will implement a new stud. The stud may be made from a combination of a lightweight sturdy material, such as foam, and a rigid member, such as plywood, solid pine, cedar, basswood, or poplar. The rigid member may surround the interior, supporting foam sheets. One skilled in the art will recognize many different woods, plastics, composites, or other rigid members may be used in constructing the stud. One skilled in the art will recognize the new stud may have many uses beyond the present frame. One such example would be to scale the stud such that it may be used in the frames and walls of homes or for other construction needs.

DETAILED DESCRIPTION OF THE INVENTION

Various embodiments of the invention will now be described in detail with reference to the accompanying drawing. These figures are merely provided to assist in the understanding of the invention and are not intended to limit the invention in any way. One skilled in the art will recognize that various modifications and changes may be made to any of these example embodiments without departing from the scope and spirit of the present invention.

Figure 1:
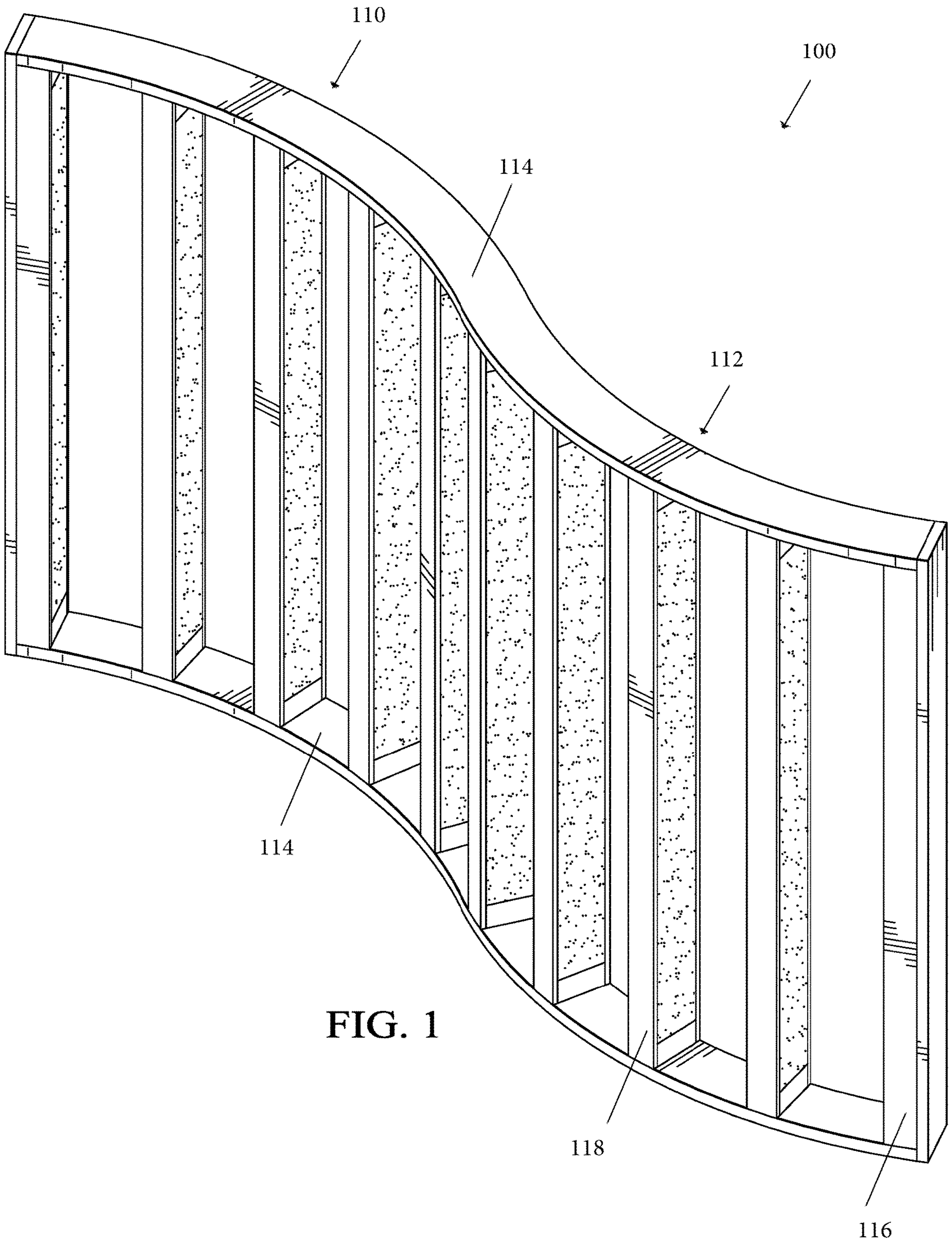
FIG. 1 is an exemplary embodiment of a frame.

Referring to FIG. 1, an exemplary embodiment of the frame 100 is depicted. The frame 100 may comprise a variety of curves; both concave 110 and convex 112 are possible. One skilled in the art will recognize the shape and length of each curve may vary between embodiments. Additionally, a curved frame of this nature may employ more than two curves. The sides of the frame 116 and the top and bottom of the frame 114 may be made of a rigid material, such as 0.5-inch plywood. One skilled in the art will recognize that all measurements and material types are presented for example purposes and are in no way meant to limit the present invention. Throughout the length of the frame, studs 118 may be installed to add additional support. The studs 118 may comprise a combination of a hollow, rigid, and sturdy material, such as wood, plastic, or composites, with the interior of the stud being lightweight foam. Alternatively, the exterior of the stud may comprise at least partially a strong and lightweight fiber such as hemp. The studs may also serve as the sides of the frame 116 instead of adding a separate piece of plywood or other material. The studs 118 may be made by affixing the outer, sturdy material to an existing foam sheet. Alternatively, the hollow cavity of the stud may be injected with expanding foam such that the expanding foam acts as the adhesive between the foam and interior stud cavity walls.

Figure 2:
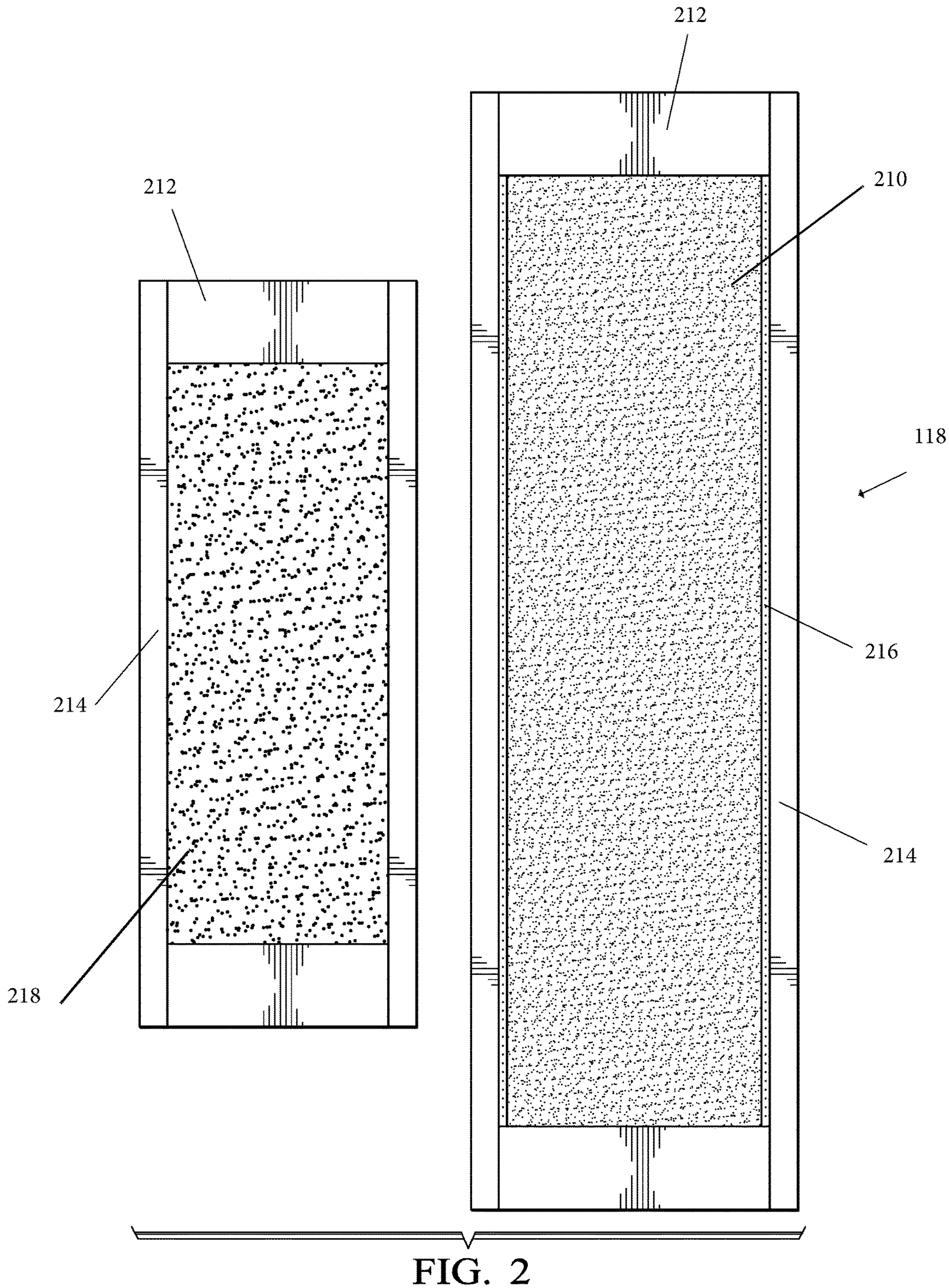
FIG. 2 are cross-section cuttings of the inventive stud.

Referring to FIG. 2, two such studs are depicted. The first stud 118 has an interior made of a 1.5-inch thick foam sheet 210. Although foam is depicted, one skilled in the art will recognize other lightweight materials may be used as well such as insulation. Surrounding the foam sheet, at least partially, may be a layer of solid pine 212, an inexpensive and strong wood. Additionally, surrounding the foam, at least partially, may be 0.25-inch thick luan plywood 214, that is, a particular grade of plywood that is made from the wood of the luan (also referred to as "lauan") tree from the South Pacific Rim. This wood is also noted for its light weight and soft texture, each of which may be useful for the present application. Both of the ends of the frame may begin with a stud for support at the weakest point of the frame. Additionally, injection foam 218 may also be used to provide the light interior material. Although pine and plywood are depicted, one skilled in the art will recognize that many other woods, plastics, or any other sturdy material may provide similar results. The majority of studs within the frame should be these lightweight studs. At a minimum, these studs will weigh less than the equivalent solid wood stud and may reduce the weight to one-third or less. Not only does the lighter stud aid in the transportation of the canvas but also reduces environmental effect as less wood or other materials are required. Solid wood studs may be included periodically along the canvas to support mounting to a wall or ceiling. Solid wood studs may be used sparingly and preferably only for mounting as they add unnecessary weight to the finished frame.

Figure 3:
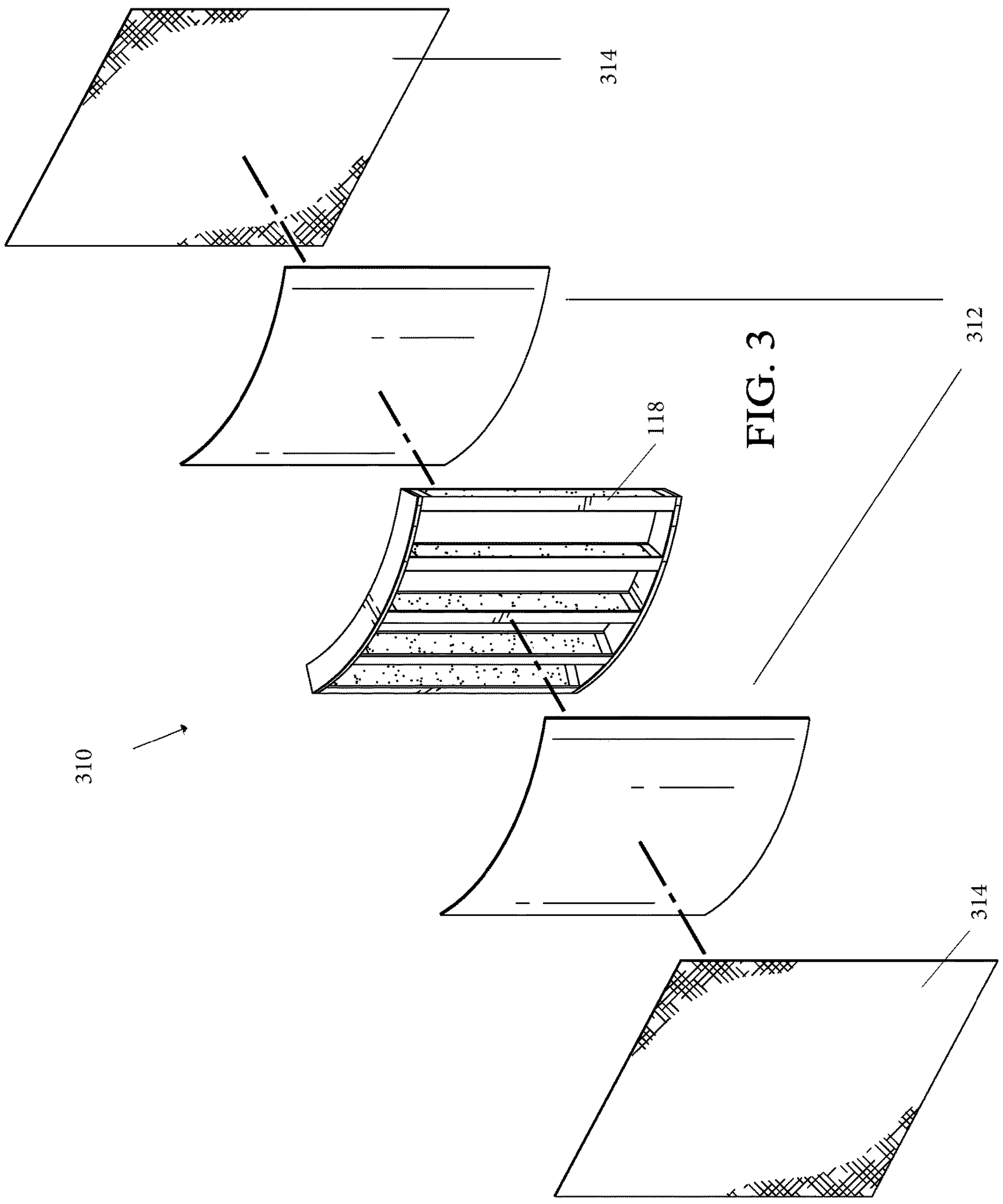
FIG. 3 is an exploded view of an inventive frame.

Referring to FIG. 3, once the frame 310 is assembled by affixing the studs 118 perpendicularly to the top and bottom pieces, a laminate 312, such as commercially available Formica, may be applied to at least the front and back wavy section of the frame. Various materials may be substituted for laminate provided that the material is flexible and continuous. These qualities prevent the canvas from rippling once applied to the frame, creating a clean appearance and much needed consistent surface for artists to paint upon. Canvas 314 may then be applied to the entire exterior surface of the frame.

Figure 4:
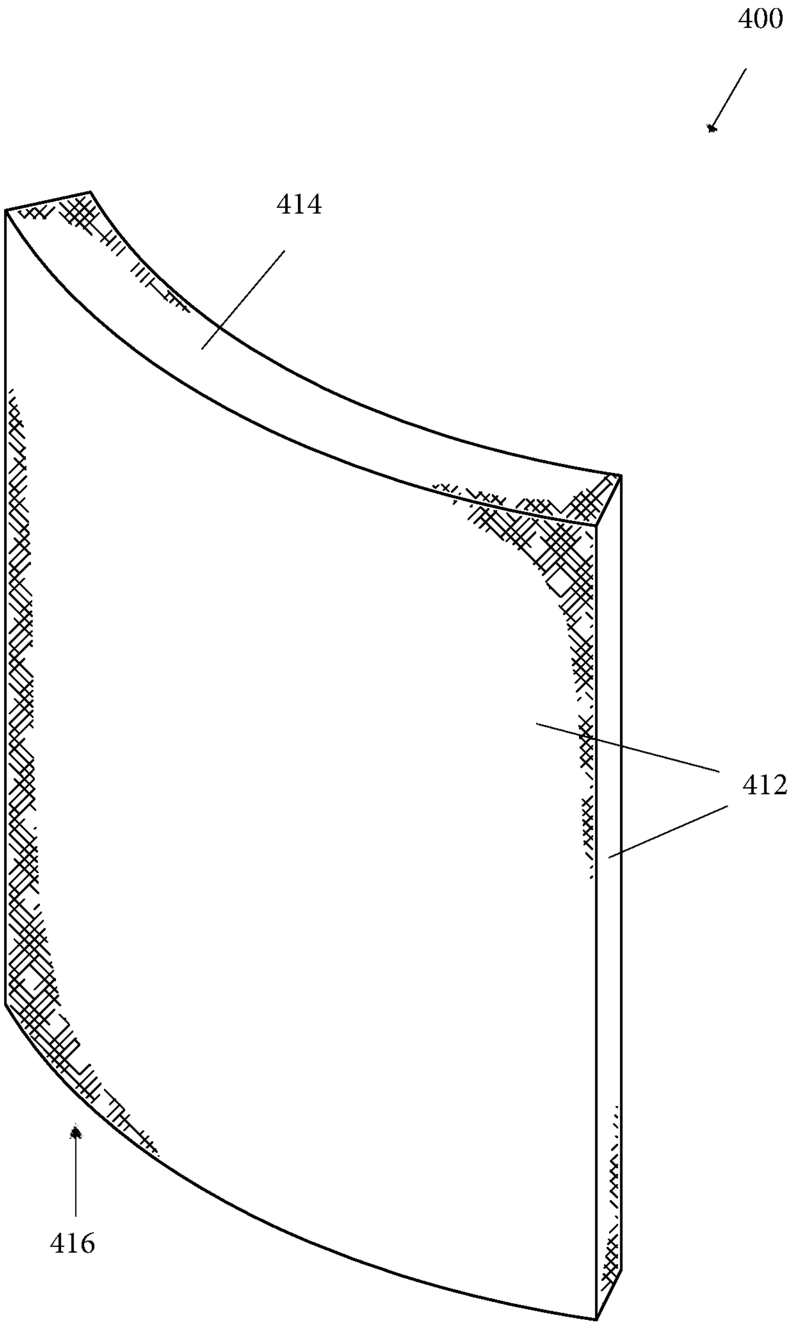
FIG. 4 is the complete canvas covered frame of FIG. 3.

Referring to FIG. 4, the canvas surrounding the frame 400 is depicted. The front, back, and two sides of the frame may comprise a single piece of canvas 412, creating a continuous look and consistent surface for a finished painting. Individual canvas pieces may be cut to the measurements of the top 414 and bottom surfaces 416 and affixed thereto. Alternatively, individual canvas pieces may be used for each separate surface. Any excess canvas strings at the edge may be cut off and sanded. The edges or the entire piece may then be covered in a primer for a final-finished look, ready for painting.

Another embodiment of the invention may have a frame made entirely of foam. A curved, rigid foam piece may be covered entirely by canvas. The foam may also contain a layer of laminate before canvas application. Such an embodiment will be even more lightweight than a frame containing wood. Different mounting techniques may be required as a solid foam frame would not have the internal strength of the studs or wooden frame.

The frame may use a variety of adhesives and fasteners to not only secure the canvas to the frame but also to secure components of the frame itself. Examples of such adhesives include construction glue 216 or a spray glue. Any stud components or frame components may be held together as the adhesives dry by use of clamps or clips. Additionally, fasteners such as nails, screws, or staples may be used to connect studs to the top or bottom of the frame or connect the rigid members surrounding the stud together.

Figure 5:
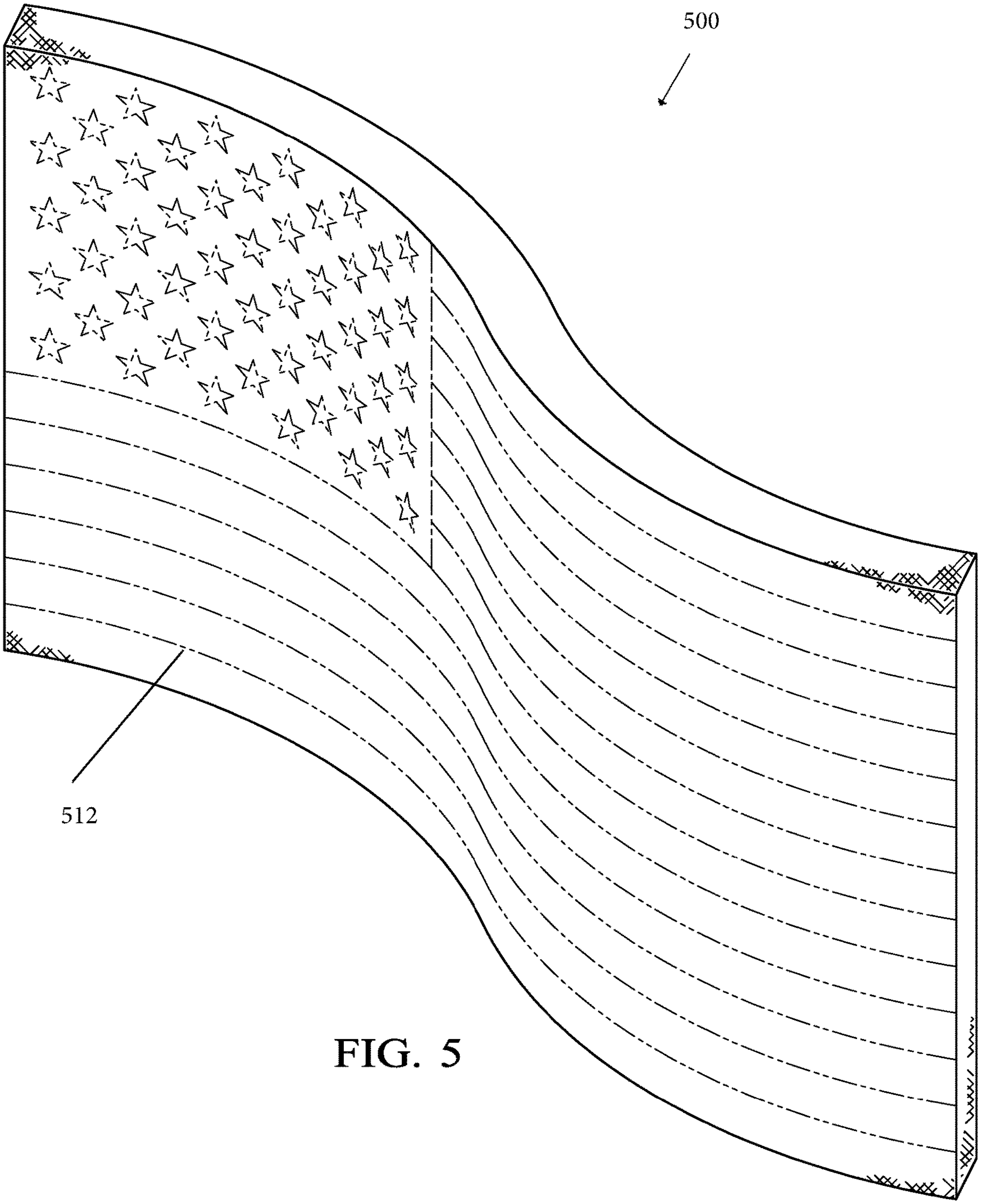
FIG. 5 is the exemplary embodiment of FIG. 1 covered with canvas and depicting a painting.
Figure 6:
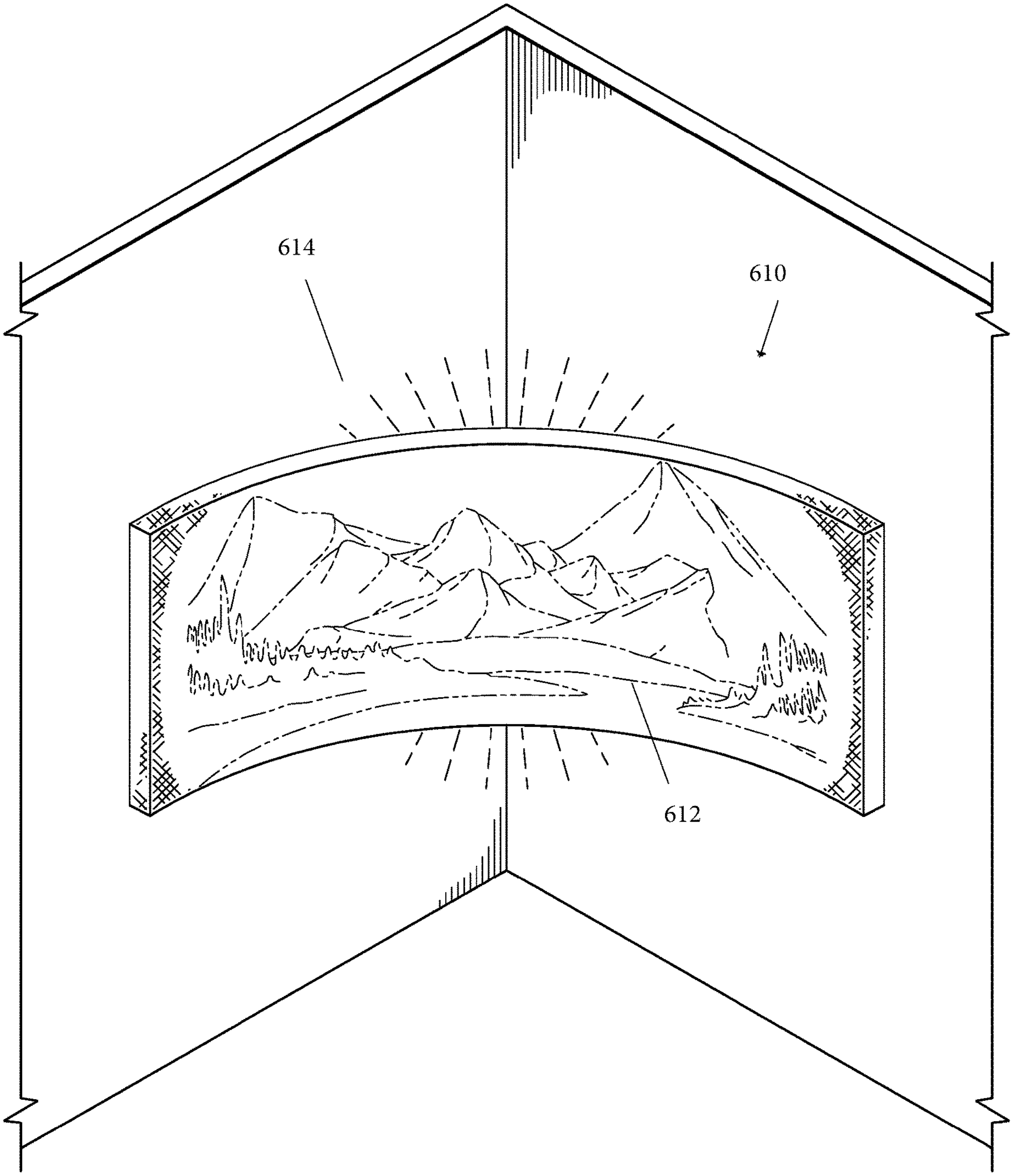
FIG. 6 is an exemplary display of a painted inventive frame with a backlight.

Referring to FIGS. 5 and 6, exemplary uses of the invention are depicted. In FIG. 5, a wavy canvas frame 500 has been painted with an American Flag design 512. The natural curve of the inventive frame allows for a flowing, windblown look and new dimension to the painting landscape. Another possible way the American flag may be depicted in an entirely new way would be to paint 14 inventive frames, 1 for the stars and 1 for each stripe, and hang them all in succession to create the American flag work of art. Such a piece could be painted by a collaboration of artists wherein each paint a single frame and all are hung together. Such collaboration could be a project for a school, in which each grade or class paint a separate canvas.

FIG. 6 is an inventive frame and canvas 610 that has been painted with a nature scene 612. This frame 610 has been hung in the corner of a wall such that the ends of the frame would travel along the walls if the frame was to continue. In this embodiment, the frame 610 may have solid wood studs at both ends to facilitate mounting. It may also have a solid wood stud at or near the middle of the frame to allow for the mounting of an LED or other backlight 614 to enhance the display of the painting.

Figure 7:
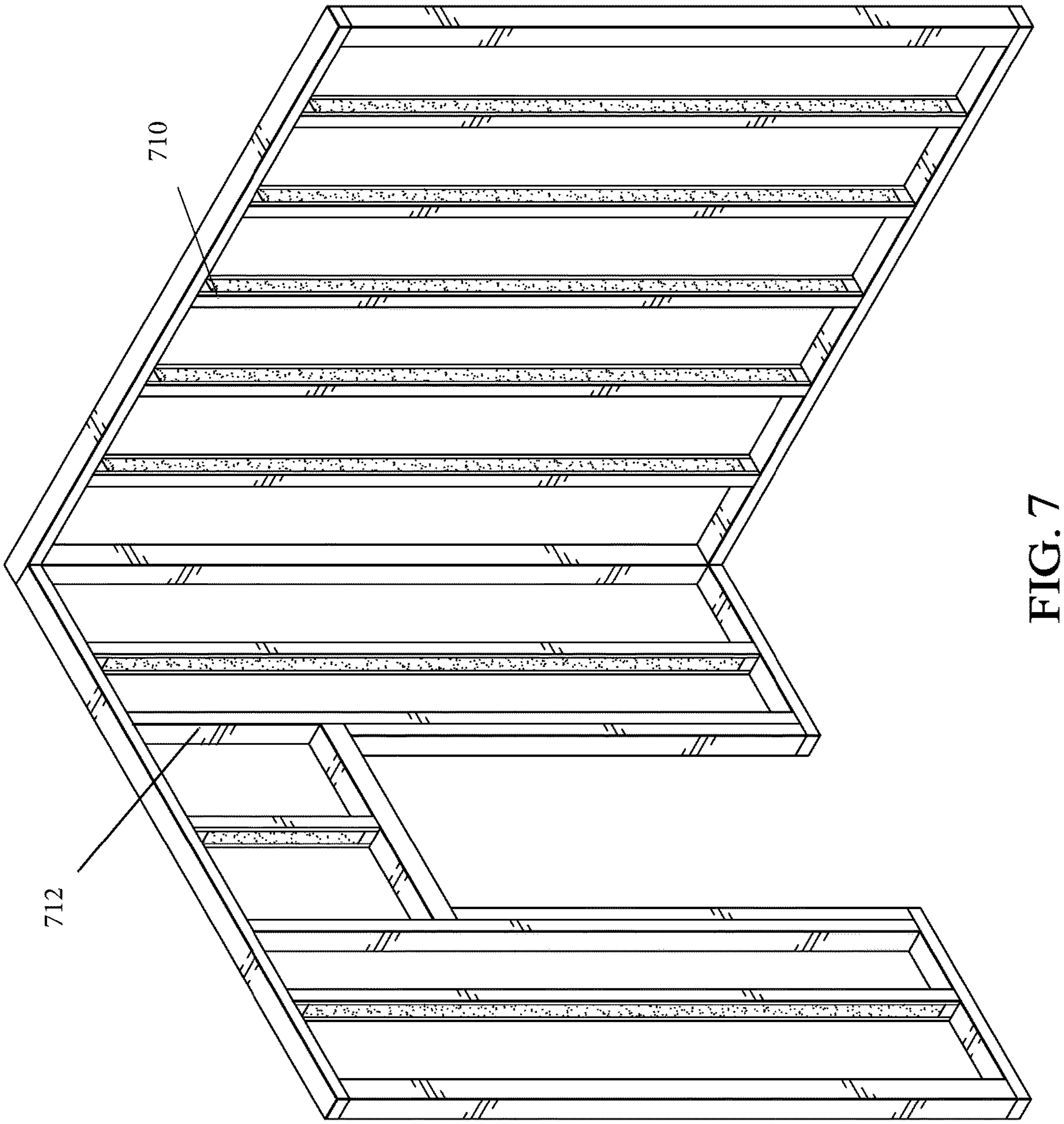
FIG. 7 depicts a corner of construction wall with use of the inventive stud.

Referring to FIG. 7, the inventive stud described herein may be used for more than just the inventive frame described herein. This new stud may be used as a strong, lightweight alternative to other weight bearing systems. One such system is depicted in FIG. 7. FIG. 7 depicts a combination of the inventive stud 710 and traditional solid wood studs 712 that could form the walls of a structure.

Any embodiment of the present invention may include any of the optional or exemplary features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A frame for providing a curved surface suitable for artistic expression comprising:

a top piece having a front face extending between parallel top and bottom faces of the top piece, and a rear face positioned opposite of the front face and extending between the parallel top and bottom faces of the top piece, wherein the top piece extends a width between the front face and rear face thereof, wherein the front face and the rear face are parallel to one another;

a bottom piece having a front face extending between parallel top and bottom faces of the bottom piece, and a rear face positioned opposite of the front face and extending between the parallel top and bottom faces of the bottom piece, wherein the bottom piece extends a width between the front face and rear face thereof, wherein the front face and the rear face are parallel to one another;

a plurality of studs affixed between the top and bottom pieces, wherein said plurality of studs are substantially perpendicular to the top and bottom pieces;

wherein the top piece and the bottom piece are each adapted to prevent deflection of the frame;

wherein the front face and the rear face of the top piece each contain at least one wave, the at least one wave comprising each of a convex curve and a concave curve in connection with one another and configured to extend in substantially opposite directions from one another;

wherein the front face and the rear face of the bottom piece each contain at least one wave, the at least one wave comprising each of a convex curve and a concave curve in connection with one another and configured to extend in substantially opposite directions from one another;

wherein the width of of the top piece is the same across the entire top piece;

wherein the width of the bottom piece is the same across the entire bottom piece;

wherein the frame is entirely surrounded by a laminate; and wherein canvas is adhesively connected to the laminate.

2. The frame of claim 1 wherein:

each stud of said plurality of studs comprises:

a foam interior substantially in the shape of a rectangular prism surrounded by an exterior member, wherein the exterior member is adapted to prevent deflection of the stud.

3. The frame of claim 1 wherein:

said canvas comprises a first top piece, a second bottom piece, and a third lateral piece, wherein said third lateral piece is a single, continuous piece of canvas covering a front, a back, and two sides of said frame.

4. The frame of claim 1 wherein:

a separate piece of canvas is adhesively connected to each exterior side of the laminate.

5. The frame of claim 1 wherein an air gap exists between each of said studs, and wherein said air gap is hidden by said canvas adhesively connected to the laminate.

6. The frame of claim 5 wherein said canvas adhesively connected to the laminate substantially conforms to each wave of the top piece and the bottom piece.

7. The frame of claim 2, wherein the exterior member of at least one stud of the plurality of studs comprises:

a top portion comprising pine, the top portion surrounding a top face of the foam interior and positioned adjacent to the top piece of the frame;

a bottom portion comprising pine, the bottom portion surrounding a bottom face of the foam interior and positioned adjacent to the bottom piece of the frame;

a first side portion comprising plywood, the first side portion surrounding a first side face of the foam interior, and extending from the top piece to the bottom piece; and a second side portion comprising plywood, the second side portion surrounding a second side face of the foam interior opposite of the first side face, and extending from the top piece to the bottom piece.

8. The frame of claim 7, wherein:

the top portion and the bottom portion of the at least one stud are each positioned entirely between the first side portion and the second side portion.

9. A frame for providing a curved surface suitable for artistic expression comprising:

a top piece having a front face extending between parallel top and bottom faces of the top piece, and a rear face positioned opposite of the front face and extending between the parallel top and bottom faces of the top piece, wherein the top piece extends a width between the front face and rear face thereof, wherein the front face and the rear face are parallel to one another;

a bottom piece having a front face extending between parallel top and bottom faces of the bottom piece, and a rear face positioned opposite of the front face and extending between the parallel top and bottom faces of the bottom piece, wherein the bottom piece extends a width between the front face and rear face thereof, wherein the front face and the rear face are parallel to one another;

a plurality of studs affixed between the top and bottom pieces, wherein said plurality of studs are substantially perpendicular to the top and bottom pieces;

wherein the top piece and the bottom piece are each adapted to prevent deflection of the frame;

wherein the front face and the rear face of the top piece each contain at least one wave, the at least one wave comprising each of a convex curve and a concave curve in connection with one another and configured to extend in substantially opposite directions from one another;

wherein the front face and the rear face of the bottom piece each contain at least one wave, the at least one wave comprising each of a convex curve and a concave curve in connection with one another and configured to extend in substantially opposite directions from one another;

wherein the width of the top piece is the same across the entire top piece;

wherein the width of the bottom piece is the same across the entire bottom piece;

wherein each stud of the plurality of studs comprises a foam interior substantially in the shape of a rectangular prism surrounded by an exterior member, wherein the exterior member is adapted to prevent deflection of the stud; and wherein the exterior member of at least one stud of the plurality of studs comprises:

a top portion comprising pine, the top portion surrounding a top face of the foam interior and positioned adjacent to the top piece of the frame;

a bottom portion comprising pine, the bottom portion surrounding a bottom face of the foam interior and positioned adjacent to the bottom piece of the frame;

a first side portion comprising plywood, the first side portion surrounding a first side face of the foam interior, and extending from the top piece to the bottom piece; and a second side portion comprising plywood, the second side portion surrounding a second side face of the foam interior opposite of the first side face, and extending from the top piece to the bottom piece.

10. The frame of claim 9, wherein:

the top portion and the bottom portion of the at least one stud are each positioned entirely between the first side portion and the second side portion.

* * * * *